(12) United States Patent
Haberl (10) Patent No.: US 8,161,374 B2
(45) Date of Patent: Apr. 17, 2012

(54) BUTTERFLY DIAGRAMS ENABLING MULTI-DIMENSIONAL PERFORMANCE ANALYSIS

(75) Inventor: Karl R. Haberl, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/605,099

(22) Filed: Oct. 23, 2009

(65) Prior Publication Data
US 2011/0099465 A1    Apr. 28, 2011

(51) Int. Cl.
G06F 17/00 (2006.01)
G06T 11/20 (2006.01)

(52) U.S. Cl. ........ 715/212; 715/217; 715/227; 345/440; 345/472

(58) Field of Classification Search .......... 715/200, 715/201, 204, 205, 212, 214, 215, 217, 219, 715/220, 226, 227, 229, 231, 234, 273, 274, 715/700, 781, 851; 345/156, 440, 440.2, 345/472, 660, 661, 663, 664, 665, 676, 679, 345/680
See application file for complete search history.

(56) References Cited

U.S. PATENT DOCUMENTS

| | | | |
|---|---|---|---|
| 6,256,649 B1 * | 7/2001 | Mackinlay et al. | 715/212 |
| 6,801,229 B1 * | 10/2004 | Tinkler | 715/853 |
| 6,892,209 B2 * | 5/2005 | Keller et al. | 1/1 |
| 6,928,436 B2 | 8/2005 | Baudel | 707/6 |
| 7,256,784 B2 * | 8/2007 | Palmer | 345/440 |
| 7,446,769 B2 * | 11/2008 | Molander et al. | 345/440 |
| 7,750,908 B2 * | 7/2010 | Kincaid et al. | 345/440 |
| 2003/0014420 A1 | 1/2003 | Jessee et al. | 707/101 |
| 2003/0028546 A1 * | 2/2003 | Keller et al. | 707/100 |
| 2003/0030637 A1 * | 2/2003 | Grinstein et al. | 345/420 |
| 2004/0212618 A1 * | 10/2004 | Palmer | 345/440 |
| 2006/0053136 A1 | 3/2006 | Ashiri | 707/101 |
| 2009/0009517 A1 | 1/2009 | Palmer | 345/440 |

OTHER PUBLICATIONS

Statistics, LLC; "*Resampling Stats Add-in for Excel User's Guide*"; Statistics.com, LLC; 2009; 230 Pgs.
3D2F.com; "*OlapX Application 4.1*"; accessed Sep. 29, 2009 from http://3d2f.com/programs/32-369-olapx-application-downdload. shtml; 4 Pgs.
SAS; "*SAS Graphical Interface with SAS Enterprise Guide*"; accessed Sep. 29, 2009 from http://www.sas.com/technologies/bi/query_reporting/guide/; 3 Pgs.

* cited by examiner

*Primary Examiner* — Maikhanh Nguyen (74) *Attorney, Agent, or Firm* — Merchant & Gould P.C.

(57) ABSTRACT

A method for multi-dimensional performance analysis may be provided. A plurality of data may be displayed in a butterfly diagram comprising a data grid, a histogram associated with column sorting criteria, and a histogram associated with row-sorting criteria. Additional information depth may be provided with conditional formatting of the cells of the data grid.

3 Claims, 4 Drawing Sheets

BUTTERFLY DIAGRAMS ENABLING MULTI-DIMENSIONAL PERFORMANCE ANALYSIS

BACKGROUND

Butterfly diagrams are a solution for providing users with multi-dimensional views of their data. In conventional systems, static displays are limited to only 2 planar dimensions (i.e., x- and y-axes). This may make it difficult for users to consider and manipulate data in additional dimensions. For example, mediums such as computer screens, whiteboards, and printed paper offer no easy or intuitive way to manipulate data beyond their traditional 2 dimensional physical form factor.

SUMMARY

Butterfly diagrams for enabling multi-dimensional performance analysis may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A method for multi-dimensional performance analysis may be provided. A plurality of data may be displayed in a butterfly diagram comprising a data grid, a histogram associated with column sorting criteria, and a histogram associated with row-sorting criteria. Additional information depth may be provided with conditional formatting of the cells of the data grid.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Butterfly diagrams may be provided. Consistent with embodiments of the present invention, a butterfly diagram may comprise multiple data sections, such as rows, columns, values, a row sort histogram, and/or a column sort histogram. The row and column sections may comprise dimensional attribute data while the row sort histogram and column sort histogram sections may comprise fact data aggregated according to the corresponding dimensional attributes in the row and column sections, respectively. The values section may comprise aggregated fact data at the intersection of the row and column sections. Further, the rows (and row values) may be sorted in descending order according to the values of the row sort histogram section; the columns (and column values) may be sorted in descending order according to the values of the column sort histogram section. Populating the sections of a butterfly diagram may create a higher intensity focus area in the upper left hand region of the value section where the rows with larger row sort histograms intersect with larger column sort histograms.

A histogram may comprise a graphical display of tabulated frequencies, shown as bars. It may show what proportion of cases fall into each of several categories. The categories may be specified as non-overlapping intervals of some variable. The displayed interval bars may be displayed as the same size and/or varied in size relative to each other to provide an additional dimension of information depth. Histograms may be used to plot density of data, and often for density estimation: estimating the probability density function of the underlying variable. The total area of a histogram used for probability density may be normalized to 1.

Figure 1:
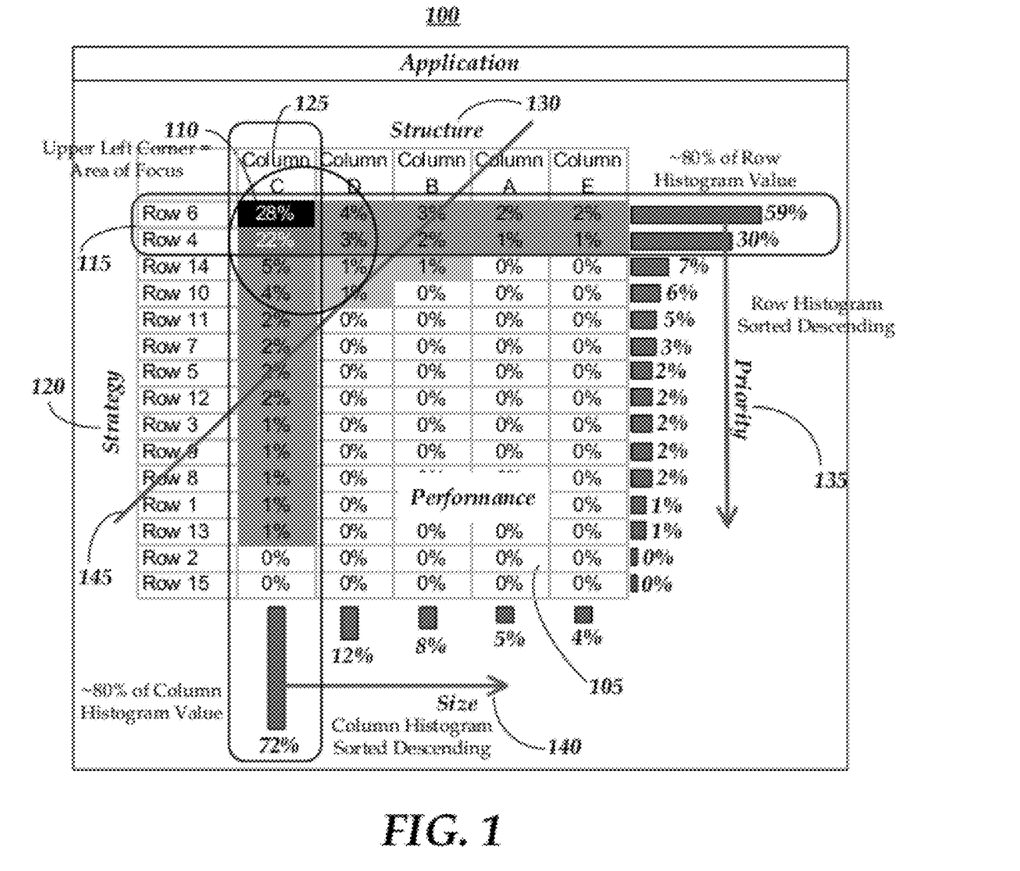
FIG. 1 is a diagram of an application.

FIG. 1 is a diagram of an application 100 for creating and/or manipulating a butterfly diagram. The butterfly diagram may comprise a data grid 105 comprising a plurality of cells such as first data cell 110. Data grid 105 may be arranged in a plurality of rows 115 associated with a first criterion 120 and a plurality of and columns 125 associated with a second criterion 130. Plurality of rows 115 may be sorted in descending order, from top to bottom, according to first criterion 120. Plurality of columns 125 may be sorted in descending order, from left to right, according to second criterion 130. Consistent with embodiments of the invention, the display order may be altered and/or manipulated, such as sorting the columns from right to left if application 100 is configured to use a language associated with a right to left reading order. Application 100 may further display a first histogram 135 associated with sorting plurality of rows 115 and a second histogram 140 associated with sorting plurality of columns 125. Each data cell of data grid 105 may comprise a value associated with an intersection of a sorted value of its respective column and row. For example, first data cell 110 may comprise a value of 28% when its sorted row priority, as displayed in first histogram 135, is 39% and its sorted column priority, as displayed in second histogram 140, is 72% (i.e., 0.39 4 0.72=0.28, or 28%). A dividing line 145 is displayed over data grid 105 to illustrate that the highest intersection values are displayed prominently to the top left of data grid 105.

Cells of data grid 105 may be formatted according to their data value, as determined by the intersection value of their respective column and row. For example, application 100 may assign a scale based on data values present in data grid 105 in order to prominently highlight the highest value and/or provide a visual grouping of similar data values. The formatting may comprise, for example, text formatting (e.g., bold, italics, and/or underlining), highlighting, coloration and/or patterning of the data value, cell border, and/or cell background, inclusion of a symbol and/or shape, and/or a change to a text font. Coloration may comprise full color and/or a grayscale gradient.

Figure 2:
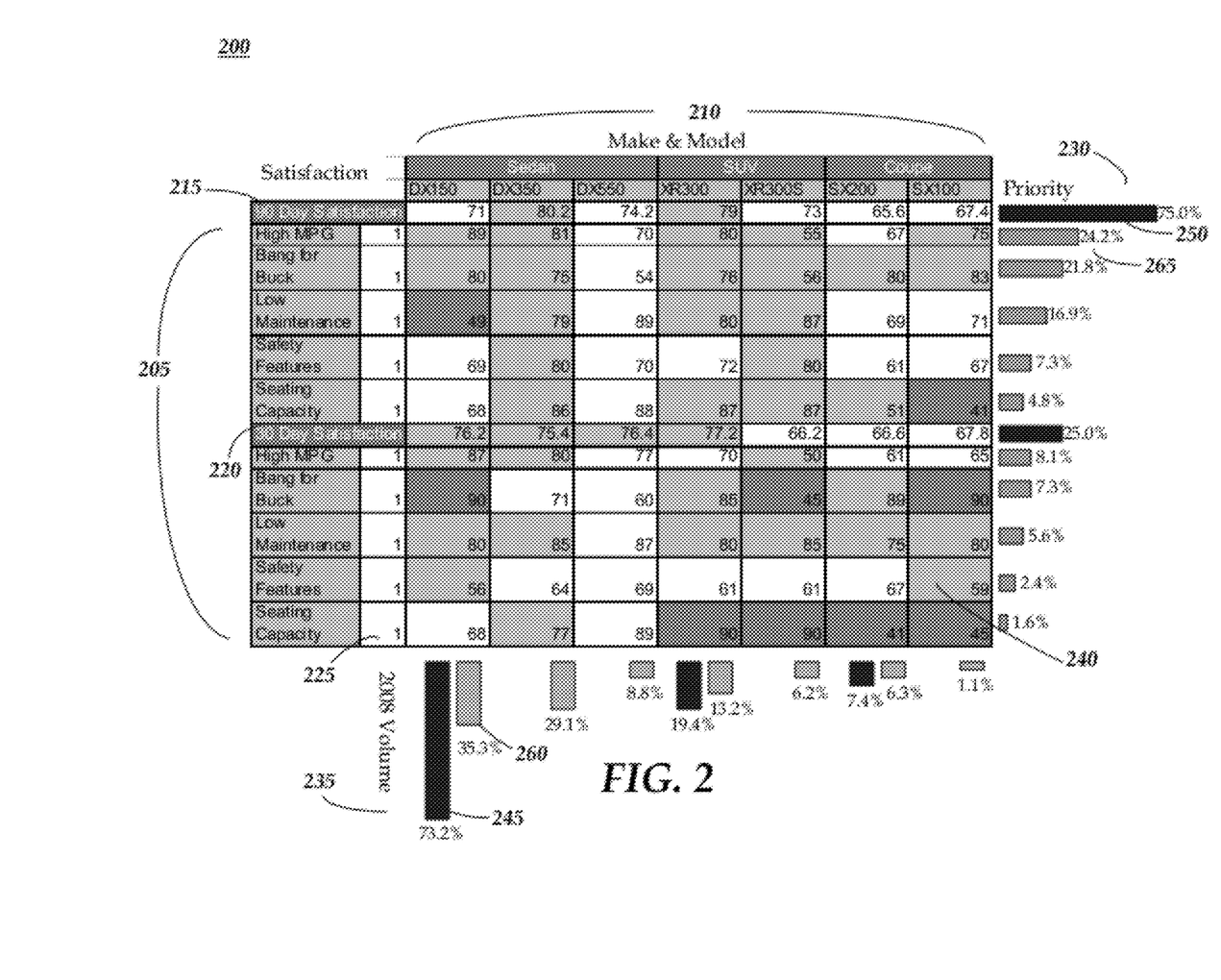
FIG. 2 is an example butterfly diagram.

FIG. 2 is an example butterfly diagram 200. Butterfly diagram 200 may comprise a plurality of rows 205 associated with satisfaction data options and a plurality of columns 210 associated with vehicle make & model structure options. Row and/or column options may be divided into subgroups, such as satisfaction options for a 90-day subgroup 215 and a 30-day subgroup 220, each of which may encompass individual data options such as High MPG, Bang for Buck, Low Maintenance, Safety Features, and Seating Capacity. Each data option may be assigned a weighting 225; in this example, all five data options are weighted equally. Similarly, subgroups for sedan, coupe, and SUV may each comprise individual structure options (e.g., individual models within a make class) associated with the Make & Model columns 210. A row histogram 230 may be displayed adjacent to a data grid 240 and a column histogram 235 may be displayed below data grid 240. Row histogram 230 may provide information related to sorting rows 205 according to a first criterion (e.g., priority placed on features by consumers) and column histogram 235 may provide information related to sorting columns 210 according to a second criterion (e.g., sales volume). Consistent with embodiments of the invention, a subgroup total bar 245, 250 may be displayed along with an individual column bar 255 and/or an individual row bar 260.

Butterfly diagram 200 may provide a way for a user to measure, monitor, and improve performance. The user may define a number of data options, such as business strategies or product features as well as structure options such as market areas and/or product lines. Consistent with embodiments of the invention, application 100 may suggest structure options associated with a user's selected data options. For example, if a user selects data options assigned with sales volume, application 100 may suggest structure options associated with ways to increase sales volume, such as the effect of expanding in new market areas.

Data may be collected for each intersection of data and structure options. For example, a user survey may be used to provide data related to satisfaction with various features of a given product model. Data across multiple features and products (i.e., the data and structure options, respectively) may be collected into a standard two-dimensional data presentation format, such as a spreadsheet. Sorting criteria for the rows and columns may then be imposed on the spreadsheet format by sorting the columns and rows independently. For example, plurality of columns 210, representing individual models, are sorted according to sales volume while plurality of rows 205 are sorted according to a priority placed on each feature by consumers. The data in each cell may comprise a raw data value, such as a percent of users rating a product feature of a particular product model as satisfactory, a scaled score representing the raw data's relationship to other raw data values, such as a value from 1-100 ranking the data cells in order, and/or a data value representing an intersection of the column and row sorting criteria, such as a product of the percentages from the associated row and column histograms.

Figure 3:
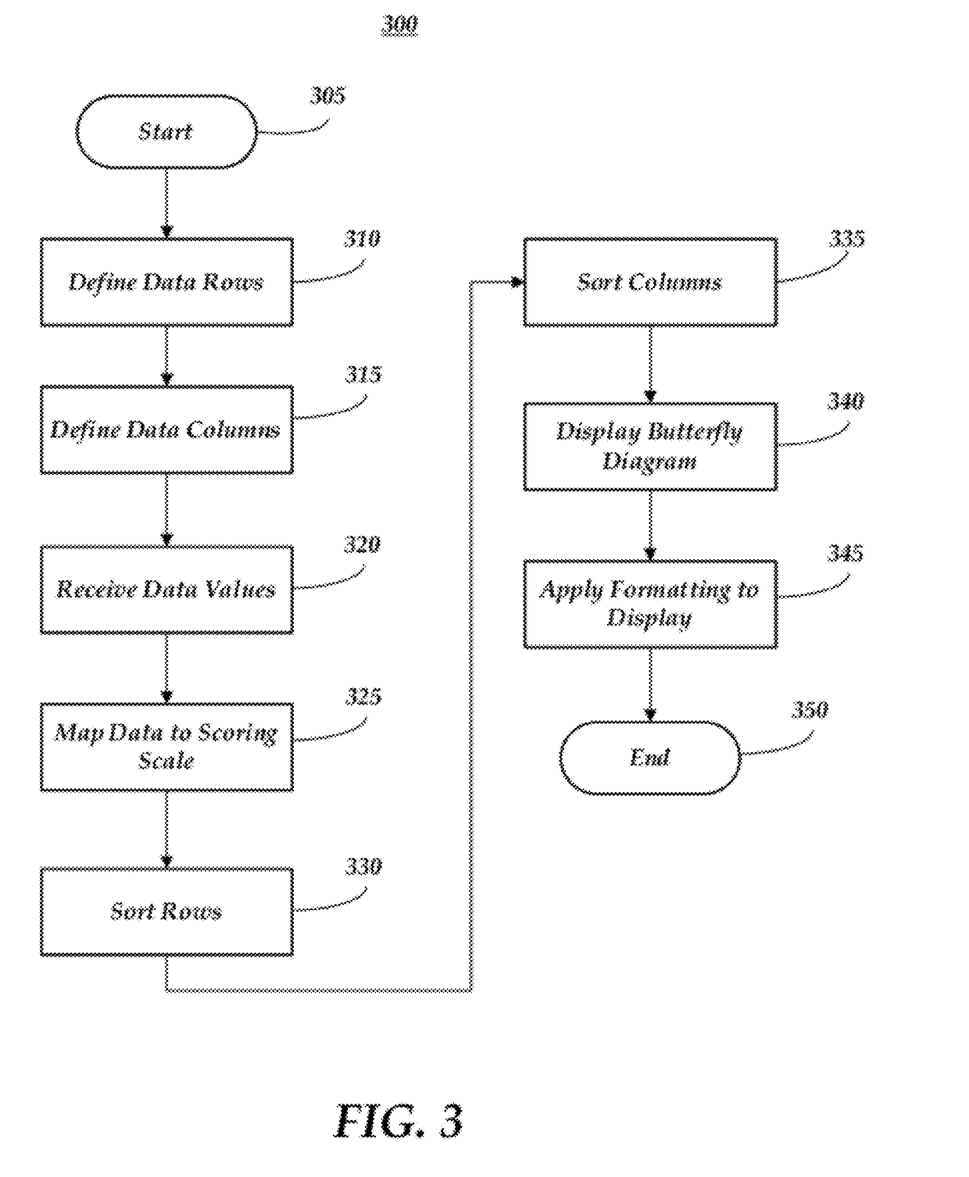
FIG. 3 is a flow chart of a method for providing multi-dimensional performance analysis.

FIG. 3 is a flow chart setting forth the general stages involved in a method 300 consistent with an embodiment of the invention for providing multi-dimensional performance analysis. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may define a plurality of data options. For example, a user may use a spreadsheet application to define an information axis along the rows of a spreadsheet.

From stage 310, method 300 may advance to stage 315 where computing device 400 may define a plurality of structure options, such as by defining a second information axis along the columns of the spreadsheet. For example, the user may define business strategies as the data options for the rows and target markets as the structure options for the columns. Consistent with embodiments of the invention, computing device 400 may be operative to provide one and/or more suggested structure options for a provided set of data options, such as by suggesting structure options of a companies related product lines in response to receiving data options comprising assorted product features. Computing device 400 may similarly provide suggested data options if the user first defines the structure options.

After defining the structure options at stage 315, method 300 may advance to stage 320 where computing device 400 may receive data values associated with the intersections of the data and structure options. The user may gather and/or enter data values into cells of the spreadsheet for each of the row and column intersection cells. For example, the user may enter an estimated dollar value impact on the user's business for the defined strategy options in each market structure. Consistent with embodiments of the invention, data need not be received for all of the data cells; that is, the user may enter data for only some of the row and column intersections.

Method 300 may then advance to stage 325 where computing device 400 may map the received data to a common scoring scale, such as 1-100. For example, the user-entered data may be converted to a scaled score value, resulting in an intermediate data grid such as that of Table 1.

TABLE 1

| | New England | West Coast | Southeast |
|---|---|---|---|
| Reduce Sales Force | | 26 | |
| Increase Sales Volume | 98 | 22 | 99 |
| Broaden Product Offerings | | | 1 |
| Increase Market Share | | 2 | |

After mapping the data to a scoring scale at stage 325, method 300 may advance to stage 330 where computing device 400 may sort the rows according to a first weighting criterion. For example, the user may rank the data options according to a personal priority and/or a perceived ease of implementation and computing device 400 may sort the rows accordingly.

Method 300 may then advance to stage 335 where computing device 400 may sort the columns according to a second weighting criterion. As with the rows, the second weighting criterion may be defined by the user and/or provided as a suggestion by computing device 400. For example, when the structure options comprise target market areas, computing device 400 may suggest sorting the columns according to existing market penetration or size of the potential target audience.

After sorting the columns at stage 335, method 300 may advance to stage 340 where computing device 400 may display a butterfly diagram comprising the sorted rows and columns. Computing device 400 may also compute and display a histogram associated with the sorted rows and columns. For example, the row sorting may define the row and column criteria as shown in Tables 2 and 3, respectively. The data option sorting histogram may be displayed adjacent to the data grid, to the right of the rows and the structure sorting histogram may be displayed below the data grid.

TABLE 2

| Data Options (Rows) | Rank/Weight |
|---|---|
| Broaden Offering | 1% |
| Increase Market Share | 80% |
| Reduce Sales Force | 2% |
| Volume | 17% |

TABLE 3

| Structures (Columns) | Rank/Weight |
|---|---|
| West Coast | 60% |
| New England | 30% |
| All The Rest | 10% |

From stage 340, method 300 may advance to stage 345 where computing device 400 may apply conditional formatting to the data grid. For example, the user may define ranking ranges for the scaled score applied at stage 325. Computing device 400 may, for example, apply a background color to the cells of the data grid according to the scaled score. For example, a scaled score of 0-5 may be colored in red, a score of 5-25 may be colored in yellow, and a score of 25-100 may be colored in green.

Consistent with embodiments of the invention, the formatting may comprise additional text-based information, such as a ranking number displayed as an exponent to the scaled score. For example, the data cell associated with the intersection of the "West Coast" data structure and the "Increase Market Share" data option, as displayed in Table 1, has a scaled score of 2. With a structure weighting for the "West Coast" market of 60% and a data option weighting of 80%, that cell may comprise the highest ranking intersection and be displayed in the upper left of the data grid. The cell may be colored in red according to the formatting rankings described above and may have a ranking number "1" displayed as an exponent to the scaled score of 2. Additionally and/or alternately, a computed factor based on the data option and structure weightings may be displayed. That is, computing device 400 may multiply the 80% row weighting times the 60% column weighting resulting in a ranking value of 48%. These computed factors may be converted to a scaled score in turn, using 48% as a base, top-end value. The user may then use these calculations to aid in deciding where and how to focus business improvement strategies. Method 300 may then end at stage 350.

An embodiment consistent with the invention may comprise a system for providing multi-dimensional data analysis. The system may comprise a memory storage and a processing unit coupled to the memory storage. The processing unit may be operative to receive data, sort the data into rows according to a first criterion, sort the data into columns according to a second criterion, and display the sorted plurality of data as a spreadsheet grid. The system may be further operative to display histograms associated with the sorting criteria along with the grid. The rows and/or columns may be divided into subgroups and histograms associated with the subgroups may be displayed.

Another embodiment consistent with the invention may comprise a system for providing multi-dimensional performance analysis. The system may comprise a memory storage and a processing unit coupled to the memory storage. The processing unit may be operative to define data options associated with rows of a data grid and data structures associated with columns of the data grid, sort data elements according to an intersection of the data options and the data structures, display the sorted data elements in a data grid, display a first histogram associated with the sorted data options to the right of the data grid, and display a second histogram associated with the sorted data structures below the data grid.

Yet another embodiment consistent with the invention may comprise a system for providing multi-dimensional performance analysis. The system may comprise a memory storage and a processing unit coupled to the memory storage. The processing unit may be operative to define a plurality of data options associated with rows of a data grid, define a plurality of structure options associated with columns of the data grid, receive a data value for each intersection of the rows and columns, map each received data value to a common scoring scale, sort the plurality of rows according to a first weighting criterion, sort the plurality of columns according to a second weighting criterion, and display the sorted plurality of rows and the sorted plurality of columns as a butterfly diagram. Being operative to display the butterfly diagram may comprise being operative to display a data value associated with an intersection of a highest value of the first weighting criterion and the second weighting criterion in an upper left cell of the data grid, display data values associated with intersections of descending values of the first weighting criteria and the second weighting criteria down and to the right such that an intersection of the lowest value of the first weighting criterion and the second weighting criterion is displayed in a lower right cell of the data grid, display a first histogram to the right of the data grid, wherein the first histogram comprises a mapping of the first weighting criterion to the sorted plurality of rows, and display a second histogram below the data grid, wherein the second histogram comprises a mapping of the second weighting criterion to the sorted plurality of columns. The system may be further operative to apply a formatting associated with the common scoring scale to each cell of the data grid, wherein the formatting comprises, for example, a text format, a font, a highlight, a text color, a background color, a symbol and/or shape, an additional text element, and/or an animation.

Figure 4:
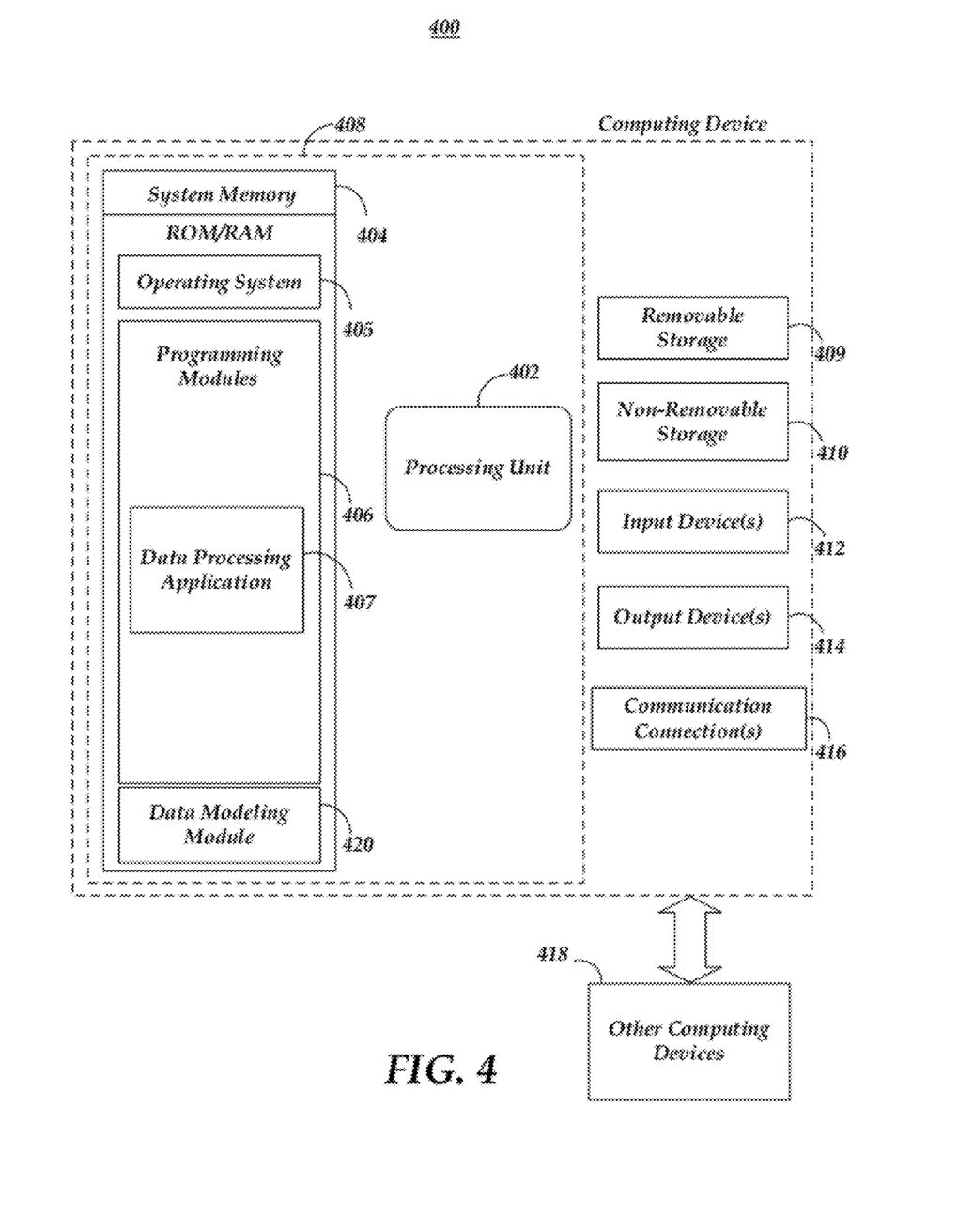
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a data processing application 407, such as a spreadsheet application. Operating system 405, for example, may be suitable for controlling computing device 400's operation. In one embodiment, programming modules 406 may include a data modeling module 420 that may be operative to provide suggested data options, structures, and/or weighting criteria. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. data processing application 420) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing multi-dimensional data analysis, the method comprising:
    defining a plurality of data options, wherein the plurality of data options are associated with a plurality of rows of a data grid;
    defining a plurality of structure options, wherein the plurality of structure options are associated with a plurality of columns of the data grid;
    receiving a data value for each intersection of the plurality of data option rows and structure option columns;
    mapping each received data value to a common scoring scale;
    sorting the plurality of rows according to a first weighting criterion;
    sorting the plurality of columns according to a second weighting criterion;
    displaying the sorted plurality of rows and the sorted plurality of columns as a butterfly diagram, wherein being operative to display the sorted plurality of rows and the sorted plurality of columns as a butterfly diagram comprises:
        displaying a data value associated with an intersection of a highest value of the first weighting criterion and the second weighting criterion in an upper left cell of the data grid,
        displaying data values associated with intersections of descending values of the first weighting criteria and the second weighting criteria down and to the right such that an intersection of the lowest value of the first weighting criterion and the second weighting criterion is displayed in a lower right cell of the data grid,
        displaying a first histogram to the right of the data grid, wherein the first histogram comprises a mapping of the first weighting criterion to the sorted plurality of rows, and
        displaying a second histogram below the data grid, wherein the second histogram comprises a mapping of the second weighting criterion to the sorted plurality of columns; and
    applying a formatting associated with the common scoring scale to each cell of the data grid, wherein the formatting comprises at least one of the following: a text format, a font, a highlight, a text color, a background color, an additional text element, and an animation.

2. A non-transitory computer-readable medium which stores a set of instructions which when executed performs a method for providing multi-dimensional performance analysis, the method executed by the set of instructions comprising:
    defining a plurality of data options, wherein the plurality of data options are associated with a plurality of rows of a data grid;
    defining a plurality of structure options, wherein the plurality of structure options are associated with a plurality of columns of the data grid;
    receiving a data value for each intersection of the plurality of data option rows and structure option columns;
    mapping each received data value to a common scoring scale;
    sorting the plurality of rows according to a first weighting criterion;
    sorting the plurality of columns according to a second weighting criterion;
    displaying the sorted plurality of rows and the sorted plurality of columns as a butterfly diagram, wherein being operative to display the sorted plurality of rows and the sorted plurality of columns as a butterfly diagram comprises:
        displaying a data value associated with an intersection of a highest value of the first weighting criterion and the second weighting criterion in an upper left cell of the data grid,
        displaying data values associated with intersections of descending values of the first weighting criteria and the second weighting criteria down and to the right such that an intersection of the lowest value of the first weighting criterion and the second weighting criterion is displayed in a lower right cell of the data grid,
        displaying a first histogram to the right of the data grid, wherein the first histogram comprises a mapping of the first weighting criterion to the sorted plurality of rows, and displaying a second histogram below the data grid, wherein the second histogram comprises a mapping of the second weighting criterion to the sorted plurality of columns; and applying a formatting associated with the common scoring scale to each cell of the data grid, wherein the formatting comprises at least one of the following: a text format, a font, a highlight, a text color, a background color, an additional text element, and an animation.

3. A system for providing multi-dimensional performance analysis, the system comprising:

a memory storage; and a processing unit coupled to the memory storage, wherein the processing unit is operative to:

define a plurality of data options, wherein the plurality of data options are associated with a plurality of rows of a data grid;

define a plurality of structure options, wherein the plurality of structure options are associated with a plurality of columns of the data grid;

receive a data value for each intersection of the plurality of data option rows and structure option columns;

map each received data value to a common scoring scale;

sort the plurality of rows according to a first weighting criterion;

sort the plurality of columns according to a second weighting criterion;

display the sorted plurality of rows and the sorted plurality of columns as a butterfly diagram, wherein being operative to display the sorted plurality of rows and the sorted plurality of columns as a butterfly diagram comprises being operative to:

display a data value associated with an intersection of a highest value of the first weighting criterion and the second weighting criterion in an upper left cell of the data grid, display data values associated with intersections of descending values of the first weighting criteria and the second weighting criteria down and to the right such that an intersection of the lowest value of the first weighting criterion and the second weighting criterion is displayed in a lower right cell of the data grid, display a first histogram to the right of the data grid, wherein the first histogram comprises a mapping of the first weighting criterion to the sorted plurality of rows, and display a second histogram below the data grid, wherein the second histogram comprises a mapping of the second weighting criterion to the sorted plurality of columns; and apply a formatting associated with the common scoring scale to each cell of the data grid, wherein the formatting comprises at least one of the following: a text format, a font, a highlight, a text color, a background color, an additional text element, and an animation.

* * * * *